US008760139B2

(12) United States Patent
Nishida et al.

(10) Patent No.: US 8,760,139 B2
(45) Date of Patent: *Jun. 24, 2014

(54) DC-DC CONVERTER CONTROL CIRCUIT AND DC-DC CONVERTER INCLUDING SAME

(75) Inventors: Junji Nishida, Osaka (JP); Masaya Uchida, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 13/607,199

(22) Filed: Sep. 7, 2012

(65) Prior Publication Data

US 2013/0063107 A1 Mar. 14, 2013

(30) Foreign Application Priority Data

Sep. 13, 2011 (JP) .................................. 2011-199591

(51) Int. Cl.
*G05F 1/00* (2006.01)

(52) U.S. Cl.
USPC ............ 323/283; 323/222; 323/282; 323/285

(58) Field of Classification Search
USPC .................. 323/222–225, 270–277, 282–285
See application file for complete search history.

(56) References Cited

U.S. PATENT DOCUMENTS

| | | | |
|---|---|---|---|
| 5,912,552 A * | 6/1999 | Tateishi | ........................ 323/285 |
| 7,319,311 B2 | 1/2008 | Nishida | |
| 7,482,796 B2 | 1/2009 | Nishida | |
| 7,504,805 B2 | 3/2009 | Nishida | |
| 7,560,911 B2 | 7/2009 | Nishida | |
| 7,936,160 B1 * | 5/2011 | Sheehan | ........................ 323/285 |
| 2006/0214648 A1 * | 9/2006 | Liu et al. | ........................ 323/222 |
| 2007/0176588 A1 | 8/2007 | Nishida | |
| 2007/0216389 A1 | 9/2007 | Nishida | |
| 2008/0061758 A1 | 3/2008 | Nishida | |
| 2008/0116869 A1 | 5/2008 | Nishida | |
| 2008/0174292 A1 | 7/2008 | Nishida | |
| 2008/0203990 A1 | 8/2008 | Nishida | |
| 2008/0315850 A1 | 12/2008 | Nishida | |
| 2009/0045791 A1 * | 2/2009 | Feng et al. | .................... 323/282 |
| 2009/0085540 A1 | 4/2009 | Nishida | |

(Continued)

FOREIGN PATENT DOCUMENTS

| | | |
|---|---|---|
| JP | 10-20563 | 1/1998 |
| JP | 2006-517379 | 7/2006 |

(Continued)

*Primary Examiner* — Timothy J Dole
*Assistant Examiner* — Yusef Ahmed
(74) *Attorney, Agent, or Firm* — Cooper & Dunham LLP

(57) ABSTRACT

A DC-DC converter control circuit, to control a DC-DC converter having an inductor and two switches, including a first feedback circuit; a second feedback circuit; a synthesis circuit to add a first feedback voltage indicating a DC component of an inductor current based on an output current of the DC-DC converter and a second feedback voltage indicating an AC component thereof to generate a third feedback voltage; a comparator to compare the third feedback voltage with a reference voltage to output a comparison result; and an on-time adjusting circuit to adjust on/off time of the switches based on the comparison result for outputting a control signal depending on the adjusting result. The second feedback voltage is generated based on a difference between input and output voltages of the DC-DC converter when the control signal is low and based on the output voltage when the control signal is high.

12 Claims, 11 Drawing Sheets

(56) References Cited

U.S. PATENT DOCUMENTS

| | | |
|---|---|---|
| 2009/0174384 A1 | 7/2009 | Michishita et al. |
| 2009/0273325 A1* | 11/2009 | Nakahashi et al. ............ 323/282 |
| 2010/0134085 A1 | 6/2010 | Nishida |
| 2011/0089918 A1* | 4/2011 | Chang ............................ 323/282 |
| 2011/0241641 A1* | 10/2011 | Chen et al. ..................... 323/284 |
| 2012/0049829 A1* | 3/2012 | Murakami ..................... 323/288 |
| 2012/0161728 A1* | 6/2012 | Chen et al. ..................... 323/271 |
| 2013/0063105 A1* | 3/2013 | Nishida et al. ................. 323/271 |
| 2013/0063106 A1* | 3/2013 | Nishida et al. ................. 323/271 |
| 2013/0063107 A1* | 3/2013 | Nishida et al. ................. 323/271 |
| 2013/0063108 A1* | 3/2013 | Nishida et al. ................. 323/271 |

FOREIGN PATENT DOCUMENTS

| | | |
|---|---|---|
| JP | 2007-4995 | 1/2007 |
| JP | 2010-35316 | 2/2010 |
| WO | WO2004/070926 A2 | 8/2004 |

* cited by examiner

US 8,760,139 B2

DC-DC CONVERTER CONTROL CIRCUIT AND DC-DC CONVERTER INCLUDING SAME

CROSS-REFERENCE TO RELATED APPLICATION

This patent application is based on and claims priority pursuant to 35 U.S.C. §119 to Japanese Patent Application No. 2011-199591, filed on Sep. 13, 2011 in the Japan Patent Office, the entire disclosure of which is hereby incorporated by reference herein.

BACKGROUND

1. Technical Field

The present disclosure relates to a DC-DC converter control circuit to control a DC-DC converter to moderate fluctuation in an output current of the DC-DC converter, and a DC-DC converter including the DC-DC converter control circuit.

2. Description of the Related Art

DC-DC converters that operate to generate a constant output current are known. FIG. 1 is a block diagram illustrating a configuration of a first conventional DC-DC converter. A DC-DC converter 100 shown in FIG. 1 includes transistors TR101 and TR102, diodes D101 through D104, an inductor L101, capacitors C101 and C102, resistors R101 through R107, operational amplifiers OP101 and OP102, a comparator CMP101, an oscillator OSC101, a reference voltage source E101. When an input voltage VIN is input to an input terminal 101, the DC-DC converter outputs an output voltage VOUT via an output terminal 102. The resistor R105 is used for detecting the output current of the DC-DC converter, the operational amplifier OP101 is used as an error comparator to control voltage, and the operational amplifier OP102 is used as an error comparator to control current. The DC-DC converter shown in FIG. 1 detects a voltage difference Vr105 across the resistor R105 generated by current flowing through the resistor R105 and controls the output current so that the output current at the output terminal 102 is kept constant based on the voltage difference Vr105.

In general, in DC-DC converters, an inductor current flowing through the inductor includes a ripple component. It is preferable that the ripple component be within a range of from 10% to 20% of the inductor current (e.g., 100 mA). However, in the DC-DC converter shown in FIG. 1, the strength of the ripple component of an inductor current I101 flowing through the inductor L101 fluctuates in accordance with the input voltage VIN and the output voltage VOUT. As a result, although an average value of the output current can be kept constant for a predetermined time period depending on the operating frequency, the output current itself cannot be kept constant.

FIG. 2 is a block diagram illustrating a configuration of a second conventional DC-DC converter. A DC-DC converter 110 shown in FIG. 2 includes transistors TR111 through TR113, a diode D111, a Zener diode D112, an inductor L111, capacitors C111 through C114, resistors R111 through R117, operational amplifiers OP111 through OP114, an inverter INV111, and a pulse-width modulator PWM111. During rectifying cycle, only during a period during which a voltage difference is present across the terminals of the inductor L111 does the operational amplifier OP111 (integrator) integrate a voltage at a positive terminal to detect the current, and keeps the output current constant based on the signal of the detection result.

However, in the DC-DC converter shown in FIG. 2, the current is detected using the integrator. Therefore, when the inductance of the inductor L111 or the frequency of the pulse-width modulator PWM111 is changed, it is necessary to change the integral constant. In addition, similarly to the DC-DC converter shown in FIG. 2, the strength of the ripple component of the inductor current flowing through the inductor L111 fluctuates, which may not keep the output current itself constant.

Thus, the output current of the DC-DC converter is affected by the fluctuation in the strength of the ripple component of the inductor current. Therefore, in the DC-DC converter, in order to reduce the fluctuation in the output current of the DC-DC converter, it is necessary to keep the strength of the ripple component of the inductor current constant.

In addition, the output current of the DC-DC converter is also affected by the fluctuation in the frequency of the ripple component of the inductor current. Therefore, in the DC-DC converter, in order to reduce the fluctuation in the output current of the DC-DC converter, it is necessary to keep the frequency of the ripple component of the inductor current constant as well.

BRIEF SUMMARY

In one aspect of this disclosure, there is a provided novel DC-DC convert control circuit to control a DC-DC converter including a power supply terminal to which an input voltage is input, a ground terminal, an output terminal to output an output voltage, a first switching element and a second switching element connected in series between the power supply terminal and the ground terminal, an inductor connected between the output terminal and a junction node between the first switching element and the second switching element, a first capacitor connected between the output terminal and the ground terminal. The DC-DC converter control circuit includes a first feedback circuit, a second feedback circuit, a synthesis circuit, a reference voltage generator circuit, a first comparator, an on-time adjusting circuit, and a driver circuit. The first feedback circuit detects an output current of the DC-DC converter, and generates a first feedback voltage indicating a direct-current component of an inductor current flowing through the inductor of the DC-DC converter based on the output current. The second feedback circuit generates a second feedback voltage indicating an alternating-current component of the inductor current flowing through the inductor of the DC-DC converter based on the input voltage and the output voltage of the DC-DC converter. The synthesis circuit adds the first feedback voltage to the second feedback voltage to generate a third feedback voltage. The reference voltage generator circuit generates a predetermined first reference voltage corresponding to a desired output current of the DC-DC converter. The first comparator compares the third feedback voltage with the first reference voltage to output a comparison result signal indicating the comparison result. The on-time adjusting circuit adjusts on-time (length of time on) and off-time (length of time off) of the switching elements based on the comparison result signal, and outputs either a high control signal or a low control signal based on the adjusting result to feed back to the second feedback circuit. The driver circuit controls the switching elements so that when the control signal is low, the first switching element is switched on and the second switching element is switched off, and when the control signal is high, the first switching element is switched off and the second switching element is switched on. The second feedback circuit operates in accordance with the control signal from the first comparator, and generates the second feedback voltage based on a difference between the input voltage and the output voltage of the DC-DC converter when the control signal is low and generates the second feedback voltage based on the output voltage of the DC-DC converter when the control signal is high.

In another aspect of this disclosure, there is a provided novel DC-DC converter including the power-supply terminal to which an input voltage is input, the ground terminal, the output terminal to output an output voltage, the first switching element and a second switching element connected in series between the power supply terminal and the ground terminal, the inductor connected between the output terminal and a junction node between the first switching element and the second switching element, the first capacitor connected between the output terminal and the ground terminal, and the above-described DC-DC converter control circuit.

BRIEF DESCRIPTION OF THE DRAWINGS

The aforementioned and other aspects, features, and advantages are better understood by reference to the following detailed description when considered in connection with the accompanying drawings, wherein.

DETAILED DESCRIPTION OF PREFERRED EMBODIMENTS

Figure 1:
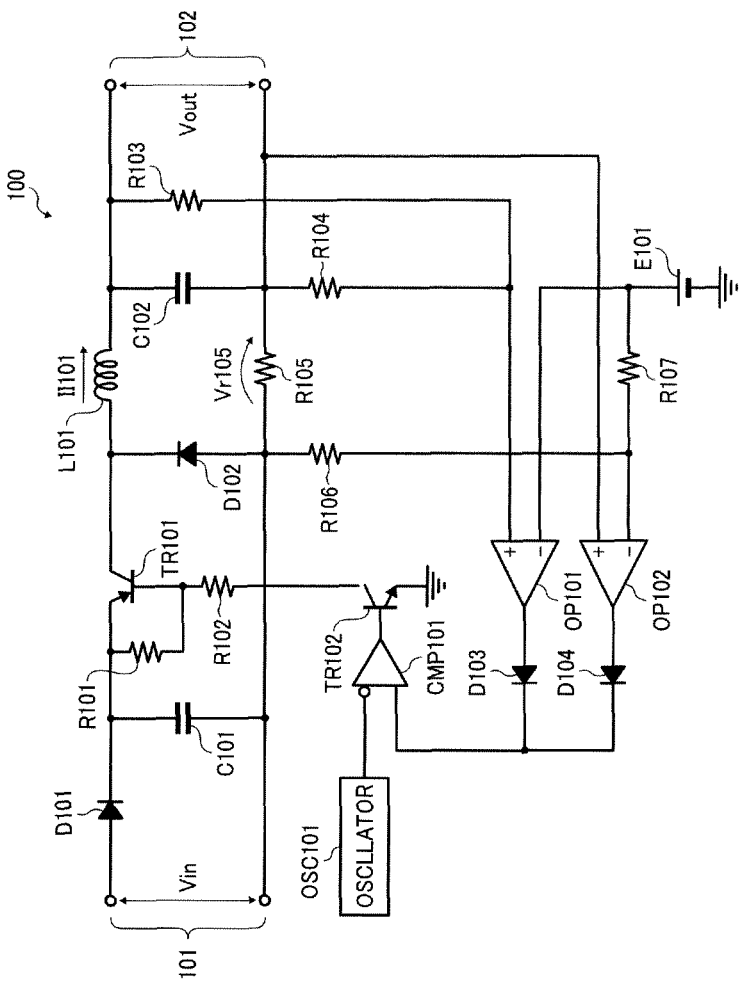
FIG. 1 is a block diagram illustrating a configuration of a first conventional DC-DC converter.
Figure 2:
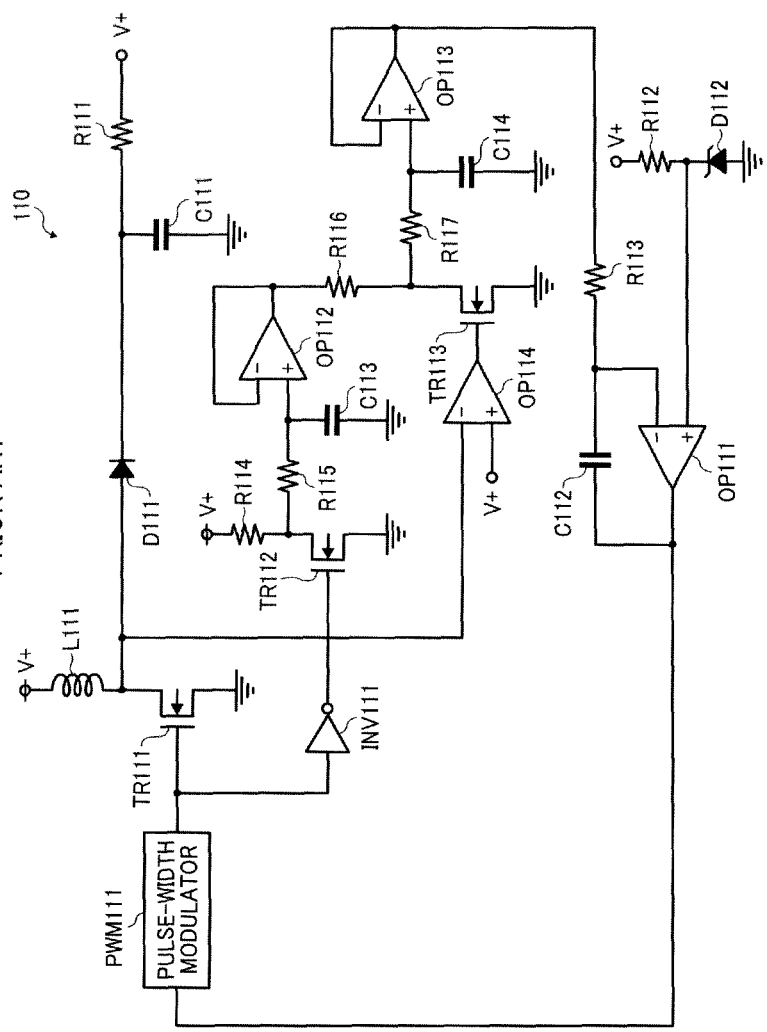
FIG. 2 is a block diagram illustrating a configuration of a second conventional DC-DC converter.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views, particularly to FIGS. 3 through 14, DC-DC converters according to illustrative embodiments is described.

First Embodiment

Figure 3:
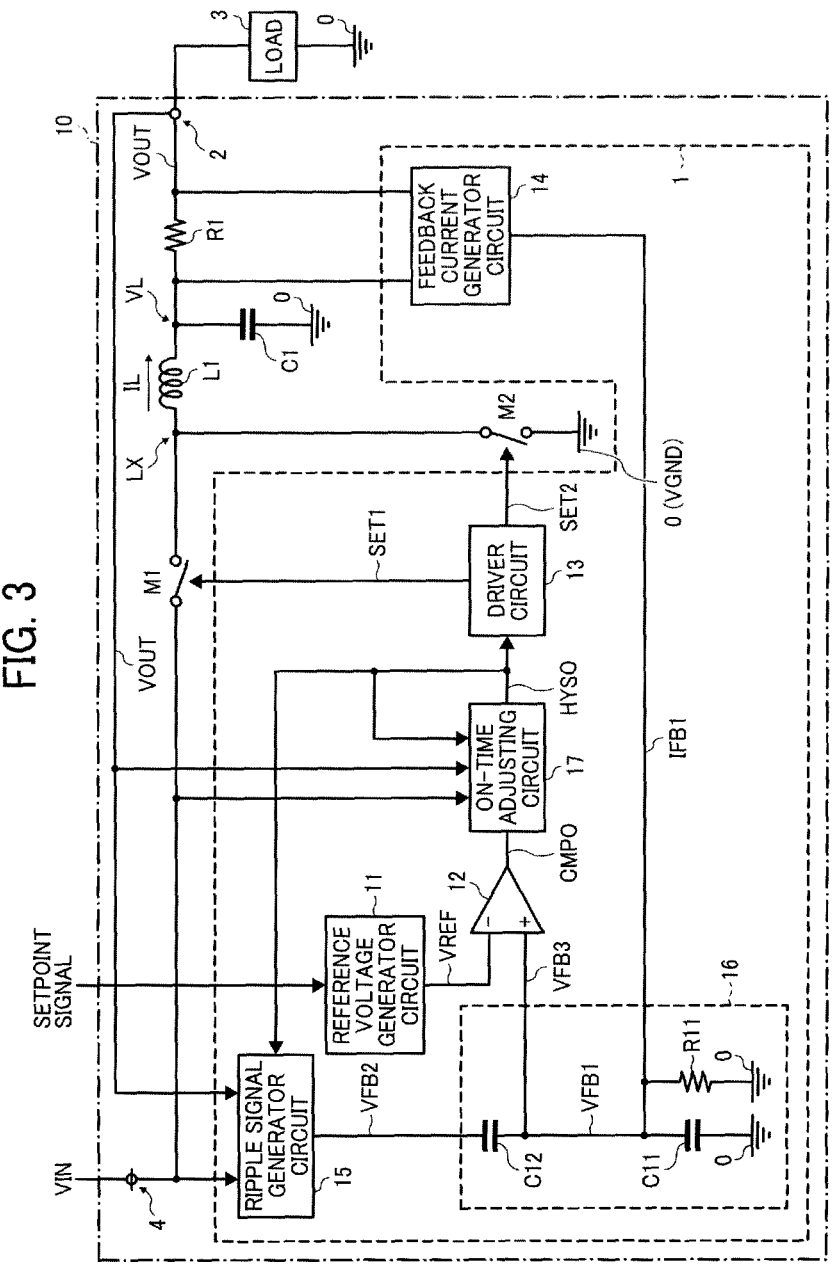
FIG. 3 is a block diagram illustrating a configuration of a DC-DC converter according to a first embodiment of this disclosure.

FIG. 3 is a block diagram illustrating a configuration of a DC-DC converter 10 according to the present embodiment of this disclosure. The DC-DC converter 10 according to the first embodiment operates to reduce fluctuation in an output current; more particularly, it operates to keep the strength of a ripple component of an inductor current of an inductor connected to the output terminal constant.

In FIG. 3, the DC-DC converter 10 includes two switching elements M1 and M2 connected in series between a power supply input terminal (power-supply terminal) 4 connected to a voltage source and a ground terminal 0, a converter control circuit 1 to control the switching elements M1 and M2, an output inductor L1 having one end connected to a junction node LX between the switching elements M1 and M2, an output capacitor C1 connected between a junction node VL of the other end of the inductor L1 and the ground terminal 0, and a resistor (output resistor) R1 for detecting the output current, connected between the junction node VL and an output terminal 2 of the DC-DC converter 10. The output terminal 2 of the DC-DC converter 10 is connected to a load 3.

Each of the switching elements M1 and M2 is constituted by, for example, power transistors. The switching element M1 functions as a power switch, and the switching element M2 functions as a rectification switch.

The converter control circuit 1 includes a reference voltage generator circuit 11, a comparator (first comparator) 12, a driver circuit 13, a feedback current generator circuit 14, a ripple signal generator circuit 15, a synthesis circuit 16, and an on-time adjusting circuit 17.

The feedback current generator circuit 14 detects a voltage difference across the resistor R1 and outputs a current corresponding to the voltage difference to the synthesis circuit 16 as a feedback current IFB1.

The synthesis circuit 16 includes a resistor R11 and capacitors C11 and C12. The resistor R11 and the capacitor C11 are electrically connected to the ground, and the resistor R11 converts the feedback current IFB1 into a voltage. Then, the capacitor C11 removes the high-frequency component from the voltage to generate a first feedback voltage VFB1 (to be described later).

The feedback current generator circuit 14, the resistor R11, and the capacitor C11 operate together as a feedback circuit to generate the first feedback voltage VFB1. The first feedback voltage VFB1 corresponds to a direct-current (DC) component of an inductor current IL across the inductor L1.

An input voltage VIN, an output voltage VOUT from the output terminal 2, and a control signal HYSO output from the comparator 12 are input to the ripple signal generator circuit 15, and the ripple signal generator circuit 15 generates a voltage signal (ripple signal) having a waveform homothetic to a waveform of the ripple component of the inductor current IL, as a second feedback voltage VFB2. The second feedback voltage VFB2 corresponds to an alternating-current (AC) component of the inductor current IL.

In the synthesis circuit 16, by synthesizing the second feedback voltage VFB2 with the first feedback voltage VFB1 via the capacitor C12 of the synthesis circuit 16, a third feedback voltage VFB3 is generated. The third feedback voltage VFB3 is input to a non-inverting input terminal (+) of the comparator 12.

A reference voltage (first reference voltage) VREF generated in the reference voltage generator circuit 11 is input to an inverting input terminal (−) of the comparator 12.

The comparator 12 compares the third feedback voltage VFB3 with the reference voltage VREF and generates a comparison result signal CMPO indicating whether or not the third feedback voltage VFB3 is higher than the reference voltage VREF, and sends the comparison result signal CMPO to the on-time adjusting circuit 17.

The comparison result signal CMPO, the input voltage VIN, and the output voltage VOUT, and a control signal HYSO output from the on-time adjusting circuit 17 itself are input to the on-time adjusting circuit 17. The on-time adjusting circuit 17 adjusts on-time and off-time of the switching elements M1 and M2 (i.e., the length of time the switching elements M1 and M2 are on and off, respectively), and outputs either a high or a low control signal HYSO depending on the results of the adjustment. The control signal HYSO is used to control the overall operation of the converter control circuit 1.

The control signal HYSO is input to the ripple signal generator circuit 15, the on-time detection circuit 17, and the driver circuit 13. In accordance with the control signal HYSO, the driver circuit 13 generates a first driving signal SET1 to control of the switching element M1 and a second driving signal SET2 to control of the switching element M2.

When the control signal HYSO is low, the switching element M1 is switched on, and the switching element M2 is switched off. Conversely, when the control signal HYSO is high, the switching element M1 is switched off and the switching element M2 is switched on.

Figure 4:
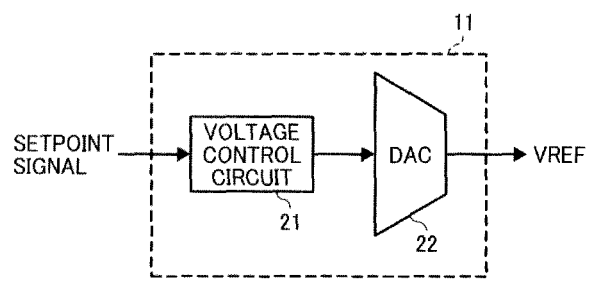
FIG. 4 is a block diagram illustrating a configuration of a reference voltage generator circuit shown in FIG. 3.

FIG. 4 is a block diagram illustrating a configuration of the reference voltage generator circuit 11 shown in FIG. 3. The reference voltage generator circuit 11 includes a voltage control circuit 21 and a digital-analog (D/A) converter (DAC) 22. The voltage control circuit 21 controls the D/A converter 22 in accordance with an external setpoint signal to generate a predetermined reference voltage (first reference voltage) VREF. The setpoint signal indicates a desired current of the inductor current IL corresponding to a desired output current of the DC-DC converter 10, and the reference voltage VREF is generated as a voltage corresponding to the desired current value.

In accordance with the setpoint signal, when the inductor current IL flowing through the inductor L1 is increased, the reference voltage generator circuit 11 increases the reference voltage VREF, and when the inductor current is decreased, the reference voltage generator circuit 11 decreases the reference voltage VREF. Accordingly, the inductor current IL is varied in accordance with the desired current value, and thus, the output current of the DC-DC converter 10 can be varied to obtain a desired value.

When the switching element M1 is switched on, and the switching element M2 is switched off, the inductor current IL essentially varies in accordance with a voltage difference between the input voltage VIN and the output voltage VOUT according to the following formula:

$$dIL/dt = (VIN - VOUT)/L1 \quad (1)$$

On the other hand, when the switching element M1 is switched off and the switching element M2 is switched on, the inductor current IL essentially varies in accordance with the output voltage VOUT according to the following formula:

$$dIL/dt = (-VOUT)/L1 \quad (2)$$

Accordingly, the ripple component of the inductor current IL has wavelengths determined by the formulas 1 and 2, in accordance with the states of the switching elements M1 and M2. Based on the input voltage VIN and the output voltage VOUT, the ripple signal generator circuit 15 generates a current having a waveform homothetic to a waveform of the ripple component of the inductor current IL, and then generates the second feedback voltage VFB2 having a waveform homothetic to a waveform of the current.

Figure 5:
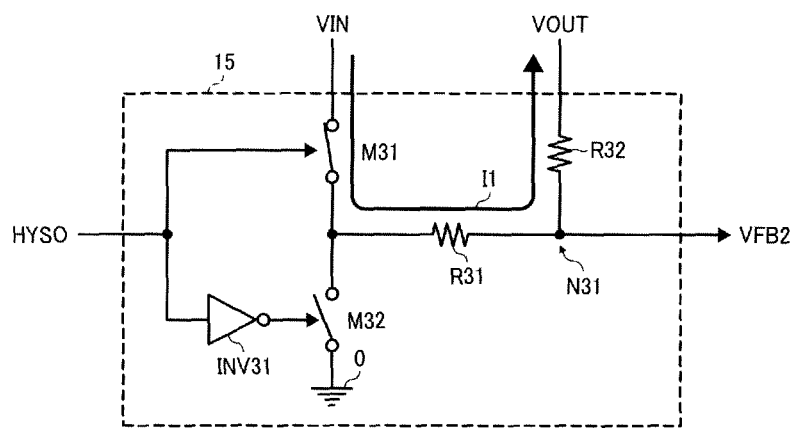
FIG. 5 illustrates operation of a ripple signal generator circuit when the control signal is high.
Figure 6:
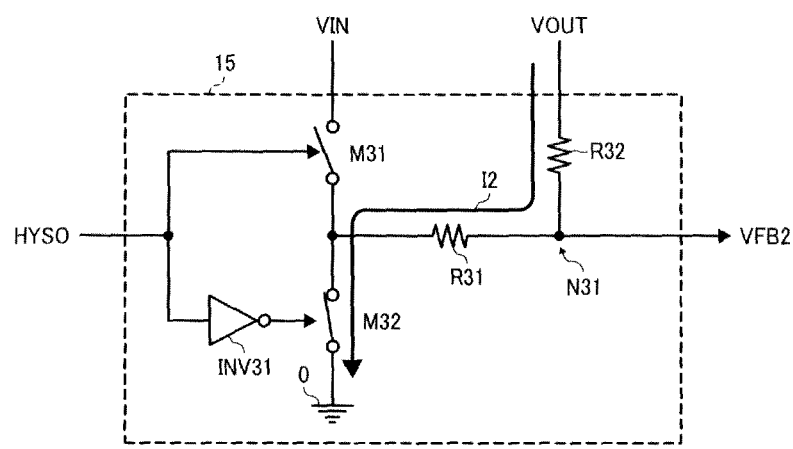
FIG. 6 illustrates the operation of the ripple signal generator circuit shown in FIG. 5 when the control signal is low.

FIGS. 5 and 6 are block diagrams illustrating the configuration of the ripple signal generator circuit 15. FIG. 5 illustrates operation of the ripple signal generator circuit 15 when the control signal HYSO is low, and FIG. 6 illustrates the operation when the control signal HYSO is high.

The ripple signal generator circuit 15 includes switching elements M31 and M32, resistors R31 and R32, and an inverter INV31. The switching element M31 and M32 are connected in series between the power supply input terminal 4 (input voltage VIN) and the ground terminal 0 (ground voltage VGND). The first resistor R31 and the second resistor R32 are connected in series between a junction node between the switching elements M31 and M32 and a terminal through which the output voltage VOUT is input. The second feedback voltage VFB2 is generated at a junction node N31 between the first resistor R31 and the second resistor R32. The generated second feedback voltage VFB2 is sent to the synthesis circuit 16.

Switching of the switching element M31 is controlled by the control signal HYSO, and switching of the switching element M32 is controlled by the control signal HYSO inverted by the inverter INV31.

While the control signal HYSO is low (FIG. 5), the switching element M31 is on and the switching element M32 is off. By contrast, while the control signal HYSO is high (FIG. 6), the switching element M31 is off and the switching element M32 is on. Namely, the switching element M31 operates in conjunction with the switching element M1, and the switching element M32 operates in conjunction with the switching element M2.

In a state in which the switching element M31 is on and the switching element M32 is off (see FIG. 5), a current I1 proportional to a value [(VIN−VOUT)/(R31+R32)] flows inside the ripple signal generator circuit 15, and the second feedback voltage VFB2 proportional to the value of the current I1 is generated at the junction node N31. In a state in which the switching element M31 is off and the switching element M32 is on (see FIG. 6), a current I2 proportional to a value [(−VOUT)/(R31+R32)] flows inside the ripple signal generator circuit 15, and the second feedback voltage VFB2 proportional to the value of the current I2 is generated at the junction node N31.

Accordingly, the ripple signal generator circuit 15 generates a current having a waveform homothetic to the waveform of the ripple component of the inductor current IL and generates the second feedback voltage VFB2 having a waveform homothetic to the waveform of the current.

The third feedback voltage VFB3 made synthetically from the first feedback voltage VFB1 and the second feedback voltage VFB2 has a waveform homothetic to the waveform of the ripple component of the inductor current IL. The value of the third feedback voltage VFB3 is increased in proportional to the voltage difference [VIN−VOUT] when the control signal HYSO is low and is decreased in proportional to the output voltage VOUT when the control signal HYSO is high.

In addition, capacitances of the capacitors C11 and C12 are selected based on the following formulas, corresponding to an average frequency "f" of the second feedback voltage VFB2 and the third feedback voltage VFB3.

$$f = a/C11 + b/C12 \tag{3}$$

Herein, "a" and "b" are certain coefficients assumed to be approximately constant. When the average frequency "f" is increased, the capacitances of the capacitors C11 and C12 are decreased so as to satisfy formula 3. When the average frequency "f" is decreased, the capacitances of the capacitors C11 and C12 are increased so as to satisfy formula 3.
(Variation of Ripple Signal Generator)

Figure 7:
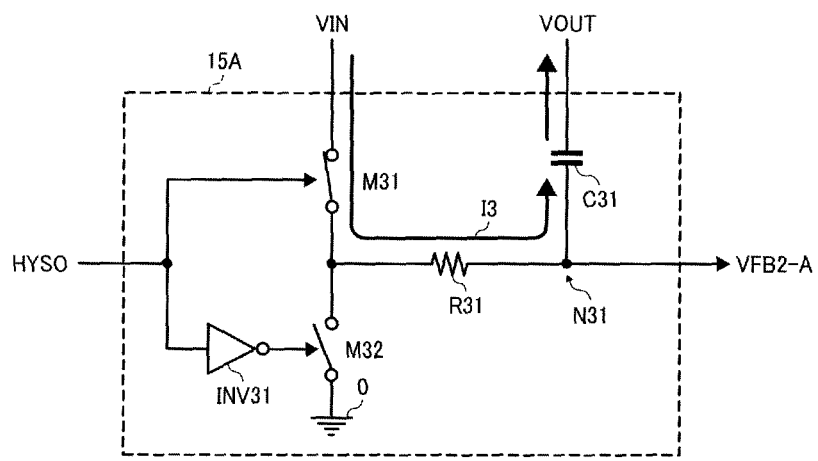
FIG. 7 illustrates the operation of a variation of a ripple signal generator circuit according to a variation shown in FIG. 5 when the control signal HYSO is low.
Figure 8:
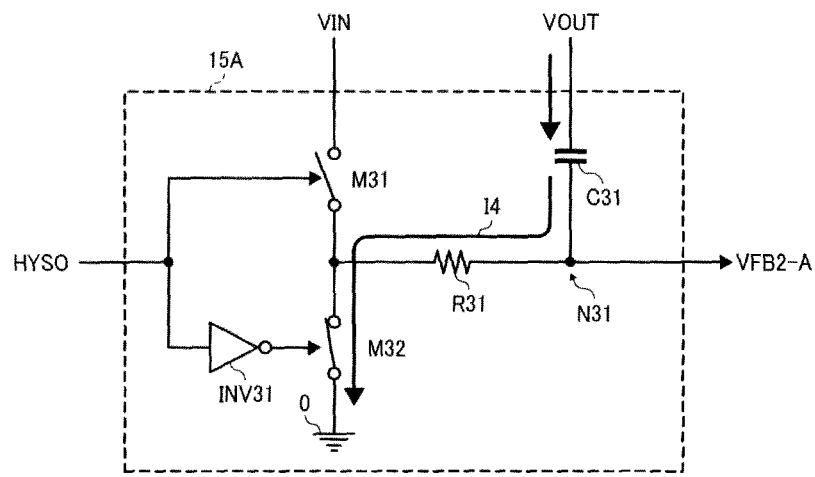
FIG. 8 illustrates the operation of the ripple signal generator circuit shown in FIG. 7 when the control signal HYSO is high.

FIGS. 7 and 8 are block diagrams illustrating a configuration of a ripple signal generator circuit 15A according to a variation of the ripple signal generator circuit 15. FIG. 7 illustrates the operation of the ripple signal generator circuit 15A when the control signal HYSO is low, and FIG. 8 illustrates the operation when the control signal HYSO is high.

The ripple signal generator circuit 15A includes a capacitor (third capacitor) C31 instead of the resistor (second resistor) R32 in the ripple signal generator circuit 15 shown in FIGS. 5 and 6.

In a state in which the switching element M31 is on and the switching element M32 is off (see FIG. 7), a current I3 proportional to a value [(VIN−VOUT)/R31] flows inside the ripple signal generator circuit 15A, and a second feedback voltage VFB2-A proportional to the value of the current I3 is generated at a junction node N31 between the resistor R31 and the capacitor C31. In a state in which the switching element M31 is off and the switching element M32 is on (see FIG. 8), a current I4 proportional to a value [(−VOUT)/R31] flows inside the ripple signal generator circuit 15A, and the second feedback voltage VFB2-A proportional to the value of the current I4 is generated at the junction node N31.

Accordingly, the ripple signal generator circuit 15A generates a current having a waveform homothetic to the waveform of the ripple component of the inductor current IL and generates the second feedback voltage VFB2-A having a waveform homothetic to the waveform of the current.

Herein, to make synthetically with the second feedback voltage VFB2-A and the first feedback voltage VFB1, the capacitances of the capacitors C12 and C31 satisfies the relation "C31<<C12."

Figure 9:
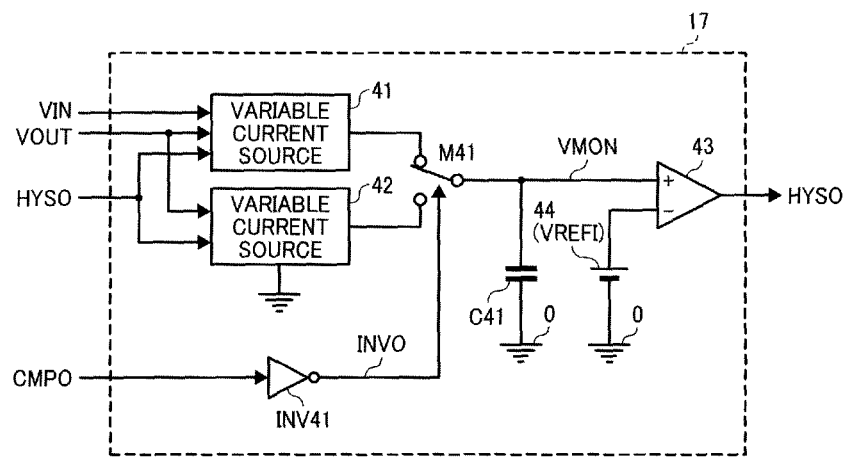
FIG. 9 is a block diagram illustrating a configuration of an on-time adjusting circuit shown in FIG. 3.

FIG. 9 is a block diagram illustrating a configuration of the on-time adjusting circuit 17. The on-time adjusting circuit 17 includes variable current sources 41 and 42, an inverter INV4, a switching element (third switching element) M41, a comparator (second comparator) 43, a capacitor (second capacitor) C41, and a reference voltage source (second reference voltage generator) 44 to generate a reference voltage (second reference voltage) VREF1. The inverter INV41 converts a comparison result signal into an inverting signal INVO. The switching element M41 operates in accordance with the inverting signal INVO (and thus with the comparison result signal CMPO). The second capacitor C41 is connected between a non-inverting input terminal (+) of the comparator 43 and the ground terminal 0. A voltage across the capacitor C41, that is, a voltage at a terminal of the capacitor C41 connected to the non-inverting input terminal (+) of the comparator 43, is a capacitor voltage VMON. The comparison result signal CMPO, the input voltage VIN, the output voltage VOUT, and the control signal HYSO are input to the on-time adjusting circuit 17.

The switching element M41 connects the first variable current source 41 to the capacitor C41 while the inverting signal INVO is low, that is, for a time period during which the third feedback voltage VFB3 is higher than the reference voltage VREF. Conversely, the switching element M41 connects the second variable current source 42 to the capacitor C41 while the inverting signal INVO is high, that is, for a time period during which the third feedback voltage VFB3 is lower than the reference voltage VREF.

The first variable current source 41 obtains the difference [VIN−VOUT] between the input voltage VIN and the output voltage VOUT when the control signal HYSO falls. Then, the first variable current source 41 sends a current based on the obtained difference [VIN−VOUT] to the second capacitor C41 while the third feedback voltage VFB3, arriving immediately after the control signal HYSO falls, equals or is higher than the first reference voltage VREF (while the inverting signal INVO is low).

The second variable current source 42 obtains the output voltage VOUT when the control signal HYSO rises. Then, the second variable current source 42 sends a current based on the obtained output voltage VOUT to the second capacitor C41 while the third feedback voltage VFB3, arriving immediately after the control signal HYSO rises, is lower than the first reference voltage VREF (while the inverting signal INVO is high).

When the inverting signal INVO is low, the current flowing from the first variable current source 41 to the capacitor C41 is proportional to the voltage difference [VIN−VOUT] between the input voltage VIN and the output voltage VOUT. When the inverting signal INVO is high, the current flowing from the first variable current source 41 to the capacitor C41 is proportional to the output voltage VOUT.

The capacitor voltage VMON of the capacitor C41 changes depending on whether the first variable current source 41 or the second variable current source 42 is connected. That is, the change in the capacitor voltage VMON depends on the current flowing through the variable current sources 41 and 42 and the capacitance of the capacitor C41.

$$VMON = VREFI - \Delta V \tag{4}$$

$$\Delta V = I/C41 \tag{5}$$

$$I \propto (VIN - VOUT) \tag{6}$$

When the current is sent from the first variable current source 41 to the capacitor C41, the capacitor voltage VMON is proportional to the voltage difference [VIN−VOUT]. When the current is sent from the second variable current source 42 to the capacitor C41, the capacitor voltage VMON is proportional to the output voltage [VOUT].

The comparator 43 compares the capacitor voltage VMON with the second reference voltage VREF1. When the capacitor voltage VMON becomes higher than the second reference voltage VREF1, the comparator 43 switches the control signal HYSO from low to high. When the capacitor voltage VMON becomes lower than the second reference voltage VREF1, the comparator 43 switches the control signal HYSO from high to low.

The voltage value of the second reference voltage VREF1 is determined by the current values of the variable current sources 41 and 42 and the capacitance of the capacitor C41.

Figure 10:
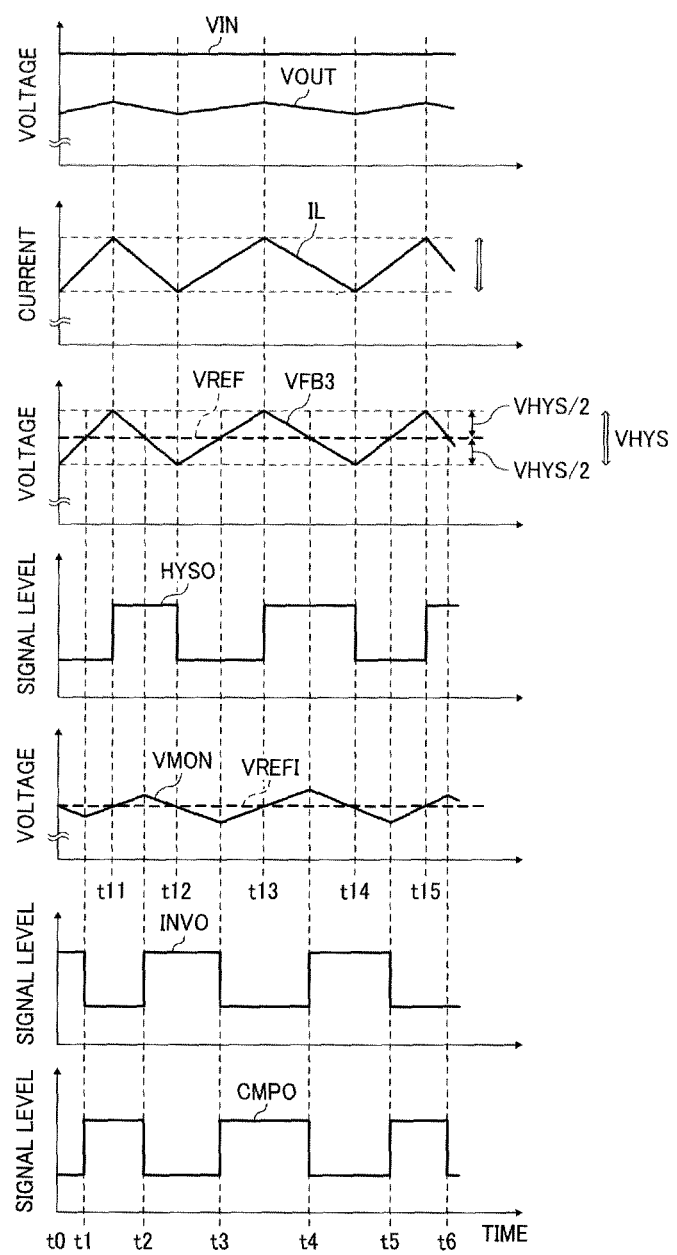
FIG. 10 is a timing chart illustrating waveforms of signals in the DC-DC converter shown in FIG. 3.

Next, operation of the DC-DC converter 10 shown in FIG. 3 is described below with reference to FIG. 10. FIG. 10 is a timing chart illustrating waveforms of the signals in the DC-DC converter 10. Herein, the reference voltage VREF is set at a predetermined constant value based on the setpoint signal, and FIG. 10 illustrates the operation of the current, signals, voltages in the DC-DC converter 10 when the reference voltage VREF is set at the predetermined constant value.

In FIG. 10, while the inverting signal INVO is low (for example, time period from t1 to t2), the capacitor voltage VMON is increased. Then, when the capacitor voltage VMON becomes higher than the second reference voltage VREF1, the comparator 43 switches the control signal HYSO from low to high. At this time, as described above, the switching element M1 is switched off, the switching element M2 is switched on, and therefore, the inductor IL starts flowing from the ground terminal 0 to the inductor L1 via the switching element M2. As the time has elapsed, the inductor current IL is decreased, and the third feedback voltage VFB3 is decreased.

While the inverting signal INVO is high (for example, time period t2 to t3), the capacitor voltage VMON is decreased. Then, when the capacitor voltage VMON becomes lower than the second reference voltage VREF1, the comparator 43 switches the control signal HYSO from high to low. At this time, the switching element M1 is switched on and the switching element M2 is switched off, and therefore, the input voltage VIN is applied to the inductor L1. As a time has elapsed, the inductor current IL is increased, and the third feedback voltage VFB3 is increased. Then, above-described operation is repeated.

When the control signal HYSO is low, the inductor current IL is changed in accordance with the voltage difference [VIN−VOUT] (see formula 1). When the control signal HYSO is high, the inductor current IL is changed in accordance with the output voltage [−VOUT] (see formula 2). In addition, when the control signal HYSO is low, the third feedback voltage VFB3 is changed in accordance with the voltage difference [VIN−VOUT]. When the control signal HYSO is high, the third feedback voltage VFB3 is changed in accordance with the output voltage [−VOUT].

Accordingly, in the DC-DC converter 10, the DC-DC converter control circuit 1 adjusts the control signals HYSO so that a length of the time period during which the control signal HYSO is low is proportional to the value of the voltage difference [VIN−VOUT], and a length of the time period during which the control signal HYSO is high is proportional to the value of the output voltage [VOUT].

In order to make the length of the time period during which the control signal HYSO is low proportional to the value of the voltage difference [VIN−VOUT], the capacitor voltage VMON can be set proportional to the voltage difference [VIN−VOUT]. In order to make the length of the time period during which the control signal HYSO is high proportional to the value of the output voltage VOUT, the capacitor voltage VMON can be set proportional to the output voltage VOUT.

The current values generated by the variable current sources 41 and 42 are determined by considering the gradient of the third feedback voltage VFB3.

As a result, the lengths of the time periods during which the control signal HYSO is low and during which the control signal HYSO is high ensure that the fluctuation range of the third feedback voltage VFB3 is restricted within the voltage range VHYS. Accordingly, the fluctuation range of the strength of the ripple component of the inductor current IL can be restricted within a predetermined range (see FIG. 10).

As described above, the DC-DC converter 10 according to the present embodiment operates to keep the strength of the ripple component of the inductor current IL, which can reduce the fluctuation in the output current. Accordingly, the DC-DC converter control circuit 10 can keep preferable load characteristics of the output current of the DC-DC converter 10.

Herein, the fluctuation range of the feedback current IFB1 obtained by the feedback current generator circuit 14 is smaller than the fluctuation range of the ripple component of the inductor current IL caused by the capacitor C1.

However, in the present embodiment, the DC-DC converter 10 acquires the DC component and the AC component of the inductor current IL separately, and make synthetically the DC component and the AC component to generate the third feedback voltage VFB3. Thus, the third feedback voltage VFB3 can accurately follow the fluctuation in the ripple component of the original inductor current IL.

(Variation of Converter Control Circuit)

Figure 11:
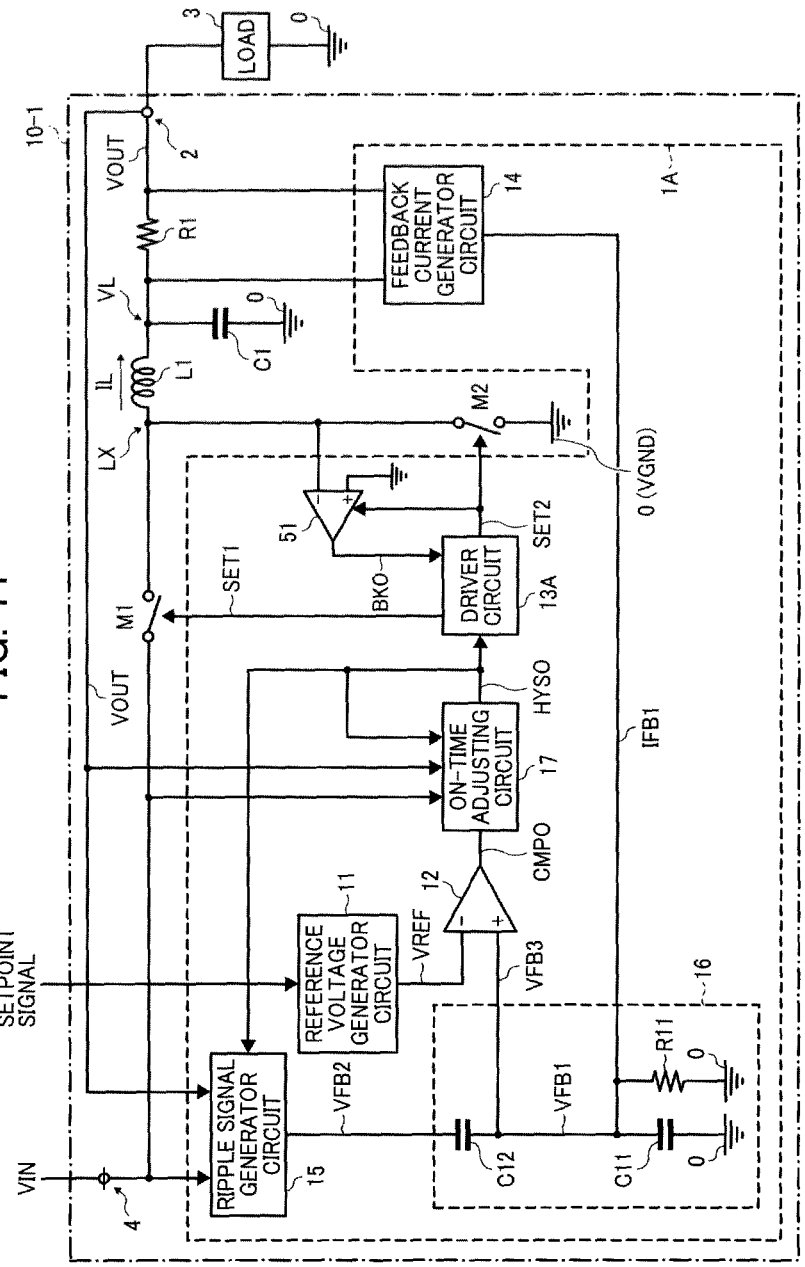
FIG. 11 is a block diagram illustrating a configuration of a DC-DC converter according to a variation of the first embodiment.

FIG. 11 is a block diagram illustrating a configuration of a DC-DC converter 10-1 according to a variation of the first embodiment.

In a converter control circuit 1A shown in FIG. 11, when the switching element M1 is on and the switching element M2 is off, the converter control circuit 1A detects an indication that a reverse current flows from the output terminal 2 to the ground terminal 0 via the inductor L1 and the switching element M2 and prevents the reverse current from flowing. More specifically, in addition to the components of the converter control circuit 1 shown in FIG. 3, the converter control circuit 1A further includes a comparator 51 (third comparator) to detect the reverse current. An inverting input terminal (−) of the comparator 51 is connected to the junction node LX, and a non-inverting input terminal (+) thereof is connected to the ground terminal 0.

When the switching element M2 is on, the comparator 51 compares a voltage at the junction node LX with the ground voltage VGND, and determines whether or not a voltage difference caused by a reverse current is generated. When a reverse current flows, the comparator 51 sends a reverse-current detection signal BKO to a driver circuit 13A.

In addition to the operation of the driver circuit 13 shown in FIG. 3, the driver circuit 13A shown in FIG. 11 switches both switching elements M1 and M2 off when the reverse-current detection signal BKO is input from the comparator 51 to the driver circuit 13A. Even when the comparator 51 detects the reverse current and the switching elements M1 and M2 are switched off, the ripple signal generator circuit 15 keeps generating the second feedback voltage VFB2 having a waveform homothetic to the waveform of the ripple component of the inductor current IL.

Accordingly, when the reverse current disappears, the driver circuit 13A can restart controlling the switching elements M1 and M2 in accordance with the control signal HYSO. In this variation, in addition to the effect of the DC-DC converter 10 shown in FIG. 3, the DC-DC converter 10-1 shown in FIG. 11 can prevent the adverse effects caused by reverse currents.

Second Embodiment

Figure 12:
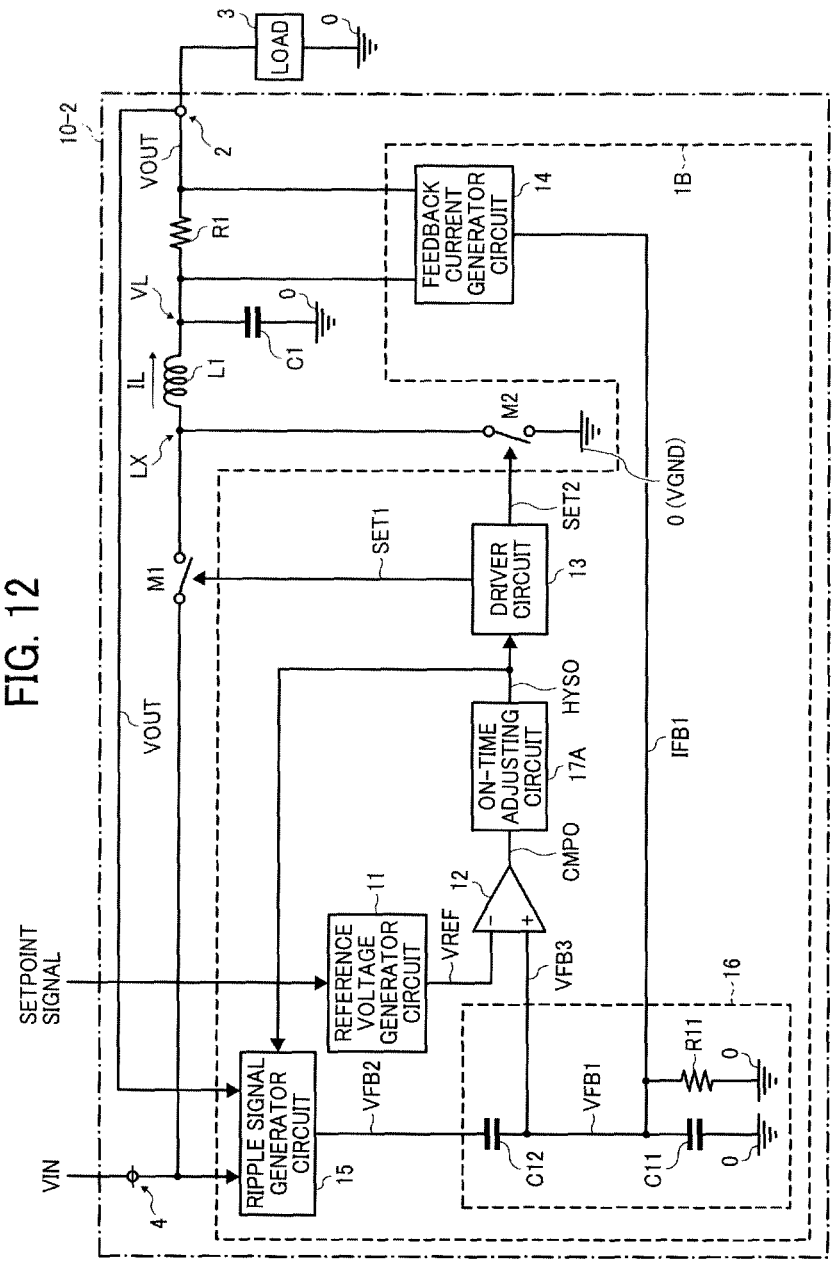
FIG. 12 is a block diagram illustrating a configuration of a DC-DC converter according to a second embodiment.

FIG. 12 is a block diagram illustrating a configuration of a DC-DC converter 10-2 according to a second embodiment. The DC-DC converter 10-2 according to the present embodiment operates to reduce fluctuation in the output current, more particularly; it operates to keep the frequency of the ripple component of the inductor current of the inductor connected to the output terminal constant.

In FIG. 12, the converter control circuit 1B includes an on-time adjusting circuit 17A including a constant current source 61, instead of the on-time adjusting circuit 17 in the converter control circuit 1 shown in FIG. 3. The on-time adjusting circuit 17A does not reference to the input voltage VIN, the output voltage VOUT, and the control signal HYSO.

Figure 13:
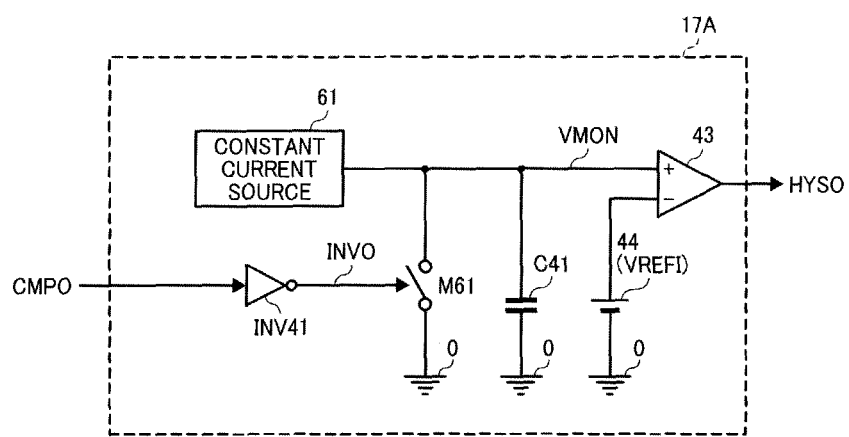
FIG. 13 is a block diagram illustrating a configuration of an on-time adjusting circuit in the DC-DC converter shown in FIG. 12.

FIG. 13 is a block diagram illustrating a configuration of the on-time adjusting circuit 17A shown in FIG. 12. In FIG. 13, the on-time adjusting circuit 17A includes a constant current source 61, an inverter INV41, a switching element (third switching element) M61 to operate in accordance with the inverting signal INVO (corresponding to the comparison result signal CMPO), a comparator (second comparator) 43, a capacitor (second capacitor) C41, and a reference voltage source (second reference voltage source) 44.

The constant current source 61 is connected to the terminal on the side of the capacitor C41 that is not grounded. The switching element M61 is connected between the ground terminal 0 and the terminal on the side of the capacitor C41 that is not grounded. The switching element M61 is switched off in a time period during which the inverting signal INVO is low, that is, the third feedback voltage VFB3 is higher than the reference voltage VREF. The switching element M61 is switched on to short out (connected to the ground terminal) in a time period during which the inverting signal INVO is high, that is, the third feedback voltage VFB3 is lower than the reference voltage VREF. Accordingly, the capacitor C41 is electrically charged while the inverting signal INVO is low, and is discharged while the inverting signal INVO is high.

Figure 14:
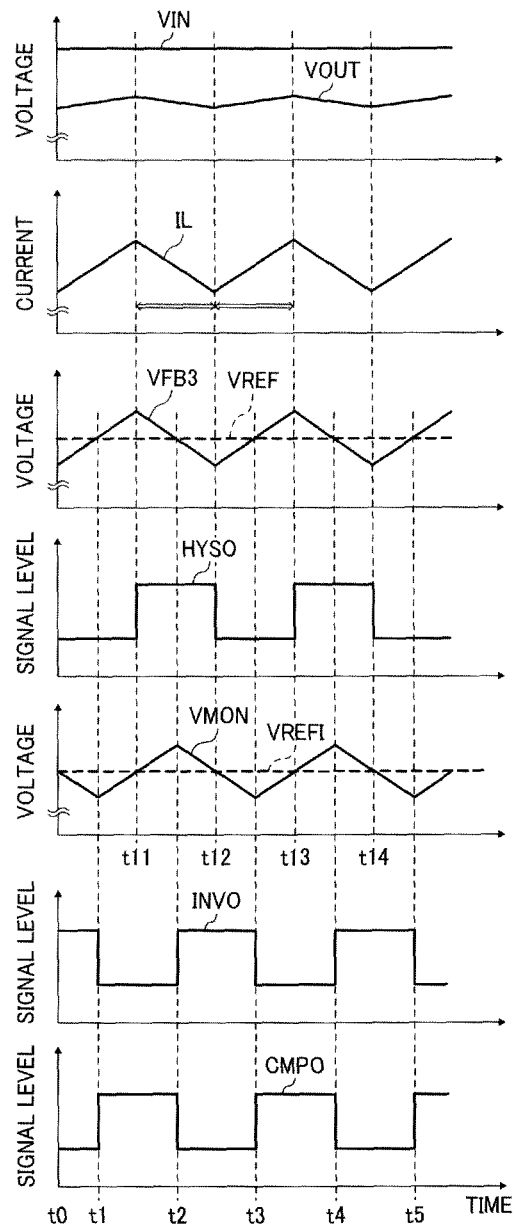
FIG. 14 is a timing chart illustrating waveforms in respective signal in the DC-DC converter shown in FIG. 12.

Next, operation of the DC-DC converter 10-2 is described below with reference to FIG. 14. FIG. 14 is a timing chart illustrating waveforms of signals in the DC-DC converter 10-2.

A constant current is applied from the constant current source 61 to the capacitor C41. Therefore, the capacitor C41 repeats charging and discharging, and the capacitor voltage VMON is periodically changed.

While the inverting signal INVO is low (for example, the time period from t1 to t2 shown in FIG. 14), the capacitor voltage VMON is increased. Then, when the capacitor voltage VMON becomes higher than the second reference voltage VREF1, the comparator 43 switches the control signal HYSO from low to high.

While the inverting signal INVO is high (for example, the time period from t2 to t3), the capacitor voltage VMON is decreased. Then, when the capacitor voltage VMON becomes lower than the second reference voltage VREF1, the comparator 43 switches the control signal HYSO from high to low. Then, above-described operation is repeated.

The capacitances of the capacitors C11 and C12 are selected to satisfy formula 3, assuming the frequency of the ripple component of the inductor current IL is "f".

As described above, the DC-DC converter 10-2 according to the second embodiment can operate to keep the frequency of the ripple component of the inductor IL constant, and thus, which can reduce the fluctuation in the output current.

The respective converter control circuits 1, 1A, and 1B can be integrated on a single integrated circuit (IC). Alternatively, the switching elements M1 and M2 can be formed as a part of the integrated circuit constituting the converter control circuits 1, 1A, and 1B. Yet alternatively, the variation of the first embodiment with reference to FIGS. 7, 8, and 11 can be combined with the configurations of the second embodiment shown in FIG. 12.

In the DC-DC converter 10, 10-1 and 10-2 according to the present disclosure, the ripple signal generator circuit 15 operates depending on the control signal HYSO. When the control signal HYSO is low, the second feedback voltage VFB2 is generated based on the voltage difference [VIN−VOUT], and when the control signal HYSO is high, the second feedback voltage VFB2 is generated based on the output voltage [VOUT].

Accordingly, whether the DC-DC converter 10 operates in discontinuous conduction mode (DCM) or continuous conduction mode (CCM), the second feedback voltage VFB2 having a waveform homothetic to the waveform of the ripple component (PWM signal) of the inductor current IL can be reliably generated.

That is, the third feedback voltage VFB3 is generated by obtaining the first feedback voltage VFB1 corresponding to the DC component of the inductor current IL and the second feedback voltage VFB2 corresponding to the AC component of the inductor current IL separately, and then synthesizing the first feedback voltage VFB1 and the second feedback voltage VFB2, which allows the third feedback voltage VFB3 to accurately follow to the fluctuation in the ripple component of the original inductor current IL.

In above-described embodiments, the ripple signal generator circuit 15 operates depending on the voltage difference [VIN−VOUT]. Therefore, even when both input voltage VIN and the output voltage VOUT fluctuate, the strength of the ripple component of the inductor current IL (first embodiment) or the frequency of the ripple component of the inductor current IL (second embodiment) can be kept constant. Accordingly, in a case in which an inductor having a different inductance is used, the DC-DC converter of the present disclosure can stably operate.

In addition, the DC-DC converter control circuit according to the present disclosure can carry out peak-current compensation.

As described above, the DC-DC converter control circuit causes the DC-DC converter to operate so that the strength or the frequency of the ripple component of the inductor current can kept constant, which can reduce fluctuation in the output current of the DC-DC converter.

In the present disclosure, the DC-DC converter can be provided having one of the above-described DC-DC converter control circuits.

Numerous additional modifications and variations are possible in light of the above teachings. It is therefore to be understood that, within the scope of the appended claims, the disclosure of this patent specification may be practiced otherwise than as specifically described herein.

What is claimed is:

1. A DC-DC converter control circuit to control a DC-DC converter including a power supply terminal to which an input voltage is input, a ground terminal, an output terminal to output an output voltage, a first switching element and a second switching element connected in series between the power supply terminal and the ground terminal, an inductor connected between the output terminal and a junction node between the first switching element and the second switching element, and a first capacitor connected between the output terminal and the ground terminal, the DC-DC converter control circuit comprising:
a first feedback circuit to detect an output current of the DC-DC converter; and generate a first feedback voltage indicating a direct-current component of an inductor current flowing through the inductor of the DC-DC converter based on the output current;
a second feedback circuit to generate a second feedback voltage indicating an alternating-current component of the inductor current flowing through the inductor of the DC-DC converter based on the input voltage and the output voltage of the DC-DC converter;
a synthesis circuit to add the first feedback voltage to the second feedback voltage to generate a third feedback voltage;
a reference voltage generator circuit to generate a predetermined first reference voltage corresponding to a desired output current of the DC-DC converter;

a first comparator to compare the third feedback voltage with the first reference voltage to output a comparison result signal indicating the comparison result;

an on-time adjusting circuit to adjust on-time (length of time on) and off-time (length of time off) of the switching elements based on the comparison result signal, and output either a high control signal or a low control signal based on the adjusting result to feed back to the second feedback circuit; and a driver circuit to control the switching elements so that when the control signal is low, the first switching element is switched on and the second switching element is switched off, and when the control signal is high, the first switching element is switched off and the second switching element is switched on, wherein the second feedback circuit operates in accordance with the control signal from the first comparator, and generates the second feedback voltage based on a difference between the input voltage and the output voltage of the DC-DC converter when the control signal is low and generates the second feedback voltage based on the output voltage of the DC-DC converter when the control signal is high.

2. The DC-DC converter control circuit according to claim 1, wherein the on-time adjusting circuit comprises:
a first variable current source;
a second variable current source;
a second comparator;
a second capacitor having a first end connected to a non-inverting input terminal of the second comparator and a second end connected to a ground terminal;
a third switching element to operate in accordance with the comparison result signal, connectable between the first end of the second capacitor and the first variable current source or between the first end of the second capacitor and the second variable current source; and
a second reference voltage generator circuit, connected between an inverting input terminal of the second comparator and the ground terminal, to generate a second reference voltage;
wherein the on-time adjusting circuit operates in accordance with the input voltage, the output voltage, and the control signal,
the third switching element connects the first variable current source to the first end of the second capacitor while the third feedback voltage is equal to or higher than the second reference voltage, and connects the second variable current source to the first end of the second capacitor while the third feedback voltage is lower than the second reference voltage,
the first current source obtains the difference between the input voltage and the output voltage when the control signal falls, and sends a current based on the obtained difference to the second capacitor while the third feedback voltage, arriving immediately after the control signal falls, is equal to or higher than the first reference voltage,
the second current source obtains the output voltage when the control signal rises, and sends a current based on the obtained output voltage to the second capacitor while the third feedback voltage, arriving immediately after the control signal rises, is lower than the first reference voltage, and
the second comparator compares a voltage of the second capacitor with the second reference voltage, switches the control signal from low to high when the voltage of the second capacitor becomes higher than the second reference voltage, and switches the control signal from high to low when the voltage of the second capacitor becomes lower than the second reference voltage.

3. The DC-DC converter control circuit according to claim 1, wherein the on-time adjusting circuit comprises:
a constant current source;
a second comparator;
a second capacitor having a first end connected to the constant current source and a non-inverting input terminal of the second comparator and a second end connected to a ground terminal;
a third switching element, to operate in accordance with the comparison result signal, connectable between the first end of the second capacitor and the ground terminal; and
a second reference voltage generator circuit, connected between an inverting input terminal of the second comparator and the ground terminal, to generate a second reference voltage;
wherein the third switching element is switched off while the third feedback voltage is equal to or higher than the second reference voltage and is switched on to short out while the third feedback voltage is lower than the second reference voltage, and
the second comparator compares a voltage of the second capacitor with the second reference voltage, switches the control signal from low to high when the voltage of the second capacitor becomes higher than the second reference voltage, and switches the control signal from high to low when the voltage of the second capacitor becomes lower than the second reference voltage.

4. The DC-DC converter control circuit according to claim 1, wherein the second feedback voltage circuit comprises:
a first resistor and a second resistor connected in series to each other,
wherein when the control signal is low, the input voltage of the DC-DC converter is applied to one end of the connected resistors, and the output voltage of the DC-DC converter is applied to the other end of the connected resistors,
when the control signal is high, the output voltage is applied to one end of the connected resistors, and the other end of the connected resistors is connected to ground;
the second feedback voltage circuit generates the second feedback voltage at a junction node between the first resistor and the second resistor.

5. The DC-DC converter control circuit according to claim 1, wherein the second feedback voltage circuit comprises:
a first resistor and a third capacitor connected in series to each other,
wherein when the control signal is low, the input voltage of the DC-DC converter is applied to a resistor side of the connected resistor and capacitor, and the output voltage of the DC-DC converter is applied to a capacitor side of the connected resistor and capacitor,
when the control signal is high, the output voltage is applied to the resistor side of the connected resistor and capacitor, and the capacitor side of the connected resistor and capacitor is connected to ground;
the second feedback voltage circuit generates the second feedback voltage at a junction node between the first resistor and the third capacitor.

6. The DC-DC converter control circuit according to claim 1, wherein the second feedback circuit comprises a ripple signal generator circuit to detect a ripple signal in accordance with a ripple current flowing through the inductor of the DC-DC converter for output as the second feedback voltage.

7. The DC-DC converter control circuit according to claim 1, further comprising:
a third comparator to detect a reverse current flowing from the output terminal to the ground terminal via the inductor and the second switching element when the first switching element is switched on,
wherein the driver circuit control the switching elements so that the both first switching element and the second switching element are switched off when the reverse current is detected.

8. The DC-DC converter control circuit according to claim 1, wherein the DC-DC converter comprises an output resistor connected between the output terminal and a junction node between the inductor and the first capacitor.

9. The DC-DC converter control circuit according to claim 8, wherein the first feedback circuit detects a voltage across the output resistor, generates a feedback current corresponding to the voltage across the output resistor, and converts the feedback current into a voltage to generate the first feedback voltage.

10. A DC-DC converter comprising:
a power supply terminal to which an input voltage is input;
a ground terminal;
an output terminal to output an output voltage;
a first switching element and a second switching element connected in series between the power supply terminal and the ground terminal;
an inductor connected between the output terminal and a junction node between the first itching element and the second switching element;
a first capacitor connected between the output terminal and the ground terminal; and
a DC-DC converter control circuit comprising:
a first feedback circuit to detect an output current of the DC-DC converter, and generate a first feedback voltage indicating a direct-current component of an inductor current flowing through the inductor based on the output current;
a second feedback circuit to generate a second feedback voltage indicating an alternating-current component of the inductor current flowing through the inductor based on the input voltage and the output voltage of the DC-DC converter;
a synthesis circuit to make synthetically the first feedback voltage and the second feedback voltage to generate a third feedback voltage;
a reference voltage generator circuit to generate a predetermined reference voltage corresponding to a desired output current of the DC-DC converter;
a first comparator to compare the third feedback voltage with the first reference voltage to output a comparison result signal indicating the comparison result;
an on-time adjusting circuit to adjust on-time and off-time of the switching elements based on the comparison result signal for outputting either a high control signal and a low control signal based on the adjusting result to feed back to the second feedback circuit; and
a driver circuit to control the switching elements so that when the control signal is low, the first switching element is switched on and the second switching element is switched off, and when the control signal is high, the first switching element is switched off and the second switching element is switched on,
wherein the second feedback circuit operates in accordance with the control signal, and the second feedback circuit generates the second feedback voltage based on the difference between the input voltage and the output voltage when the control signal is low and generates the second feedback voltage based on the output voltage when the control signal is high.

11. The DC-DC converter according to claim 10, further comprising:
an output resistor connected between the output terminal and a junction node between the inductor and the first capacitor.

12. The DC-DC converter according to claim 11, wherein the first feedback circuit of the DC-DC converter control circuit detects a voltage across the output resistor, generates a feedback current corresponding to the voltage across the output resistor, and converts the feedback current into a voltage to generate the first feedback voltage.

* * * * *